(12) United States Patent
Uesugi et al.

(10) Patent No.: US 9,656,596 B2
(45) Date of Patent: May 23, 2017

(54) VEHICLE LAMP SYSTEM

(71) Applicants: Koito Manufacturing Co., Ltd., Tokyo (JP); TOYOTA JIDOSHA KABUSHIKI KAISHA, Toyota-shi, Aichi-ken (JP)

(72) Inventors: Atsushi Uesugi, Shizuoka (JP); Hideki Uchida, Shizuoka (JP); Tatsuya Takagaki, Nisshin (JP); Takuya Murakami, Shizuoka (JP)

(73) Assignees: Koito Manufacturing Co., Ltd., Tokyo (JP); Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 15/214,772

(22) Filed: Jul. 20, 2016

(65) Prior Publication Data
US 2017/0057403 A1   Mar. 2, 2017

(30) Foreign Application Priority Data

Aug. 27, 2015 (JP) .................................. 2015-167922

(51) Int. Cl.
*B60Q 1/14* (2006.01)
(52) U.S. Cl.
CPC ........... *B60Q 1/1423* (2013.01); *B60Q 1/143* (2013.01); *B60Q 2300/112* (2013.01); *B60Q 2300/122* (2013.01); *B60Q 2300/41* (2013.01); *B60Q 2300/42* (2013.01)

(58) Field of Classification Search
CPC .. B60Q 1/143; B60Q 1/1423; B60Q 2300/41; B60Q 2300/42; B60Q 2300/112; B60Q 2300/122
See application file for complete search history.

(56) References Cited

U.S. PATENT DOCUMENTS

| 2004/0179367 A1* | 9/2004 | Takeda ..................... B60Q 1/04 362/466 |
| 2013/0002135 A1* | 1/2013 | Kanamori ................ B60Q 1/08 315/82 |
| 2013/0294100 A1* | 11/2013 | Ishizaki ................ B60Q 1/143 362/465 |
| 2014/0152826 A1* | 6/2014 | Liken ..................... H04N 7/183 348/148 |

(Continued)

FOREIGN PATENT DOCUMENTS

JP   2008-137516 A   6/2008

*Primary Examiner* — Douglas W Owens
*Assistant Examiner* — Pedro C Fernandez
(74) *Attorney, Agent, or Firm* — Claire Zopf

(57) ABSTRACT

A vehicle lamp system includes a lamp unit, a control unit that controls a change in luminance of LEDs of the lamp unit, and a storage unit that stores information indicating a priority of an event. In a case in which a second event occurs while the luminance of the LEDs is being gradually changed to reach first luminance in a first period, the control unit gradually changes the luminance of the LEDs to reach second luminance in a second period if the priority of the second event is higher than the priority of the first event, and gradually changes the luminance of the LEDs to reach the second luminance irrespective of the second period if the priority of the second event is lower than the priority of the first event.

4 Claims, 6 Drawing Sheets

(56) References Cited

U.S. PATENT DOCUMENTS

2015/0091439 A1* 4/2015 Wright .................. B60Q 1/143
  315/82
2015/0246633 A1* 9/2015 Futamura ............... B60Q 1/143
  362/466

* cited by examiner

FIG. 2

| EVENT 34a | PRIORITY 34b | GRADUAL-CHANGE TIME (msec) 34c |
|---|---|---|
| BEAM SWITCHING | 1 | 700 |
| TARGET DETECTION | 2 | 400 |
| VEHICLE-SPEED CHANGE | 3 | 300 |
| STEERING-ANGLE CHANGE | 4 | 200 |

34

VEHICLE LAMP SYSTEM

BACKGROUND OF THE INVENTION

1. Field of the Invention

The present invention relates to vehicle lamp systems.

2. Description of the Related Art

Typically, a vehicle lamp can switch between a low beam and a high beam. The low beam illuminates a close range at a predetermined illuminance. Light-distribution patterns of the low beam are regulated so as not to cause glare to oncoming vehicle or leading vehicle, and the low beam is used mainly when the vehicle travels in a city area. Meanwhile, the high beam illuminates a distant, broad front range at a relatively high illuminance and is used mainly when the vehicle travels at high speed on a road with little oncoming vehicle or little leading vehicle. Thus, the high beam provides better visibility for the driver than the low beam does but disadvantageously causes glare to a driver of a leading vehicle or of an oncoming vehicle or to a pedestrian.

In recent years, a technique for dynamically and adaptively controlling a high-beam light-distribution pattern on the basis of conditions surrounding a vehicle has been proposed (see, for example, JP2008-137516). According to this technique, the presence of a leading vehicle, an oncoming vehicle, or a pedestrian is detected, and light in a region corresponding to the detected vehicle or pedestrian is attenuated to reduce glare to the vehicle or pedestrian.

In a vehicle lamp system such as the one described in JP2008-137516, when a predetermined light-distribution pattern that is in the middle of switching in association with a certain event is to be switched to a different light-distribution pattern in association with another even that has occurred after the aforementioned event, the light-distribution pattern is switched with the priority given to a switching time corresponding to the later-occurring event. This may be preferable in terms of simplifying control but leaves room for improvement in terms of the comfort for the driver.

SUMMARY OF THE INVENTION

The present invention has been made in view of such a situation and is directed to providing a vehicle lamp system that can improve the comfort for a driver.

In order to solve the problem described above, a vehicle lamp system according to an aspect of the present invention includes a lamp unit that combines light beams from a plurality of light-emitting elements to illuminate with a predetermined beam, a control unit that controls a change in luminance of the plurality of light-emitting elements in accordance with at least one of an instruction from a vehicle and information indicating a driving condition, and a storage unit that stores information indicating a priority of an event that causes the luminance of the plurality of light-emitting elements to be changed. In a case in which a second event occurs while the luminance of the plurality of light-emitting elements is being gradually changed to reach first luminance in a first period corresponding to a first event, the control unit: (i) gradually changes the luminance of the plurality of light-emitting elements to reach second luminance in a second period corresponding to the second event if priority of the second event is higher than priority of the first event; and (ii) gradually changes the luminance of the plurality of light-emitting elements to reach the second luminance irrespective of the second period if the priority of the second event is lower than the priority of the first event.

BRIEF DESCRIPTION OF THE DRAWINGS

Embodiments will now be described by way of example only, with reference to the accompanying drawings, which are meant to be exemplary, not limiting and wherein like elements are numbered alike in several Figures in which:

FIG. 2 illustrates an example of a data structure of a storage unit;

DETAILED DESCRIPTION OF THE INVENTION

The invention will now be described by reference to the preferred embodiments. This does not intend to limit the scope of the present invention but to exemplify the invention. The size of the component in each figure may be changed in order to aid understanding. Some of the components in each figure may be omitted if they are not important for explanation.

Figure 1:
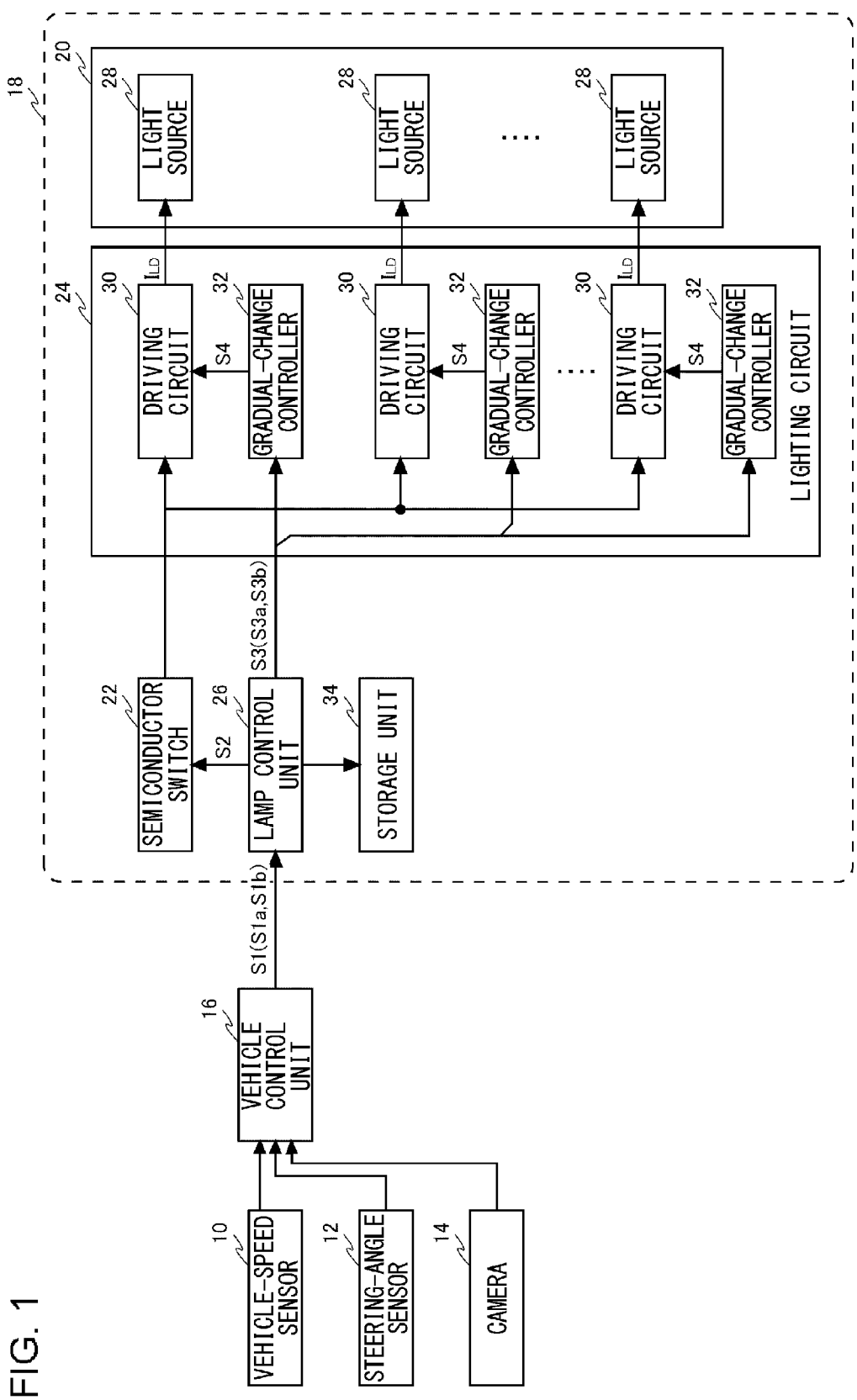
FIG. 1 is a block diagram of a vehicle lamp system according to an embodiment.

FIG. 1 is a block diagram of a vehicle lamp system 100 according to an embodiment. The vehicle lamp system 100 includes a vehicle-speed sensor 10, a steering-angle sensor 12, a camera 14, a vehicle control unit 16, and a vehicle lamp 18.

The vehicle-speed sensor 10 detects the rotational speed of the wheels to thus detect the speed of the vehicle. The steering-angle sensor 12 detects the steering angle of the steering wheel. The camera 14 captures an image of an area in front of the vehicle.

The vehicle control unit 16 controls the vehicle as a whole. The vehicle control unit 16 detects the presence of a leading vehicle or an oncoming vehicle and the position of the detected vehicle on the basis of the image information acquired by the camera 14. On the basis of this detection result, the vehicle speed information, and the steering angle information, the vehicle control unit 16 determines a light-distribution pattern that is formed by a combination of an on-region that is to be illuminated with a light beam and an off-region (blocked region) that is not to be illuminated with a light beam. The vehicle control unit 16 transmits, to the vehicle lamp 18, a pattern instruction S1 indicating the determined light-distribution pattern.

The vehicle lamp 18 forms a high-beam light-distribution pattern. The actual vehicle lamp 18 is equipped with, in addition to a high beam, an additional high beam for illuminating a farther range, a low beam, a clearance lamp, and so on, but these are omitted herein.

The vehicle lamp 18 includes a lamp unit 20, a semiconductor switch 22, a lighting circuit 24, and a lamp control unit 26. The actual vehicle lamp system 100 is provided with a pair of right and left vehicle lamps 18, but only one of the two is shown herein.

The lamp unit 20 includes a plurality of semiconductor light-emitting elements (e.g., LEDs) 28 that can be turned on/off individually. Each LED 28 is turned on upon a driving current $I_{LD}$ being supplied thereto.

The semiconductor switch 22 is provided on a path through which power is supplied from a battery (not illustrated) to the lighting circuit 24, and the on/off of the semiconductor switch 22 is controlled in accordance with a control signal S2 from the lamp control unit 26. The semiconductor switch 22 is on when the LEDs 28 are on.

A storage unit 34 stores information pertaining to an event that causes a light-distribution pattern to be switched (i.e., that causes the luminance of an LED 28 to be changed). FIG. 2 illustrates an example of a data structure of the storage unit 34. The storage unit 34 stores an event 34*a*, a priority 34*b*, and a gradual-change time 34*c* that are associated with one another.

The event 34*a* indicates an event that causes the luminance of an LED 28 to be changed. The term "beam switching" means on/off switching of a high beam, or more specifically, on/off switching by the driver or means automatic on/off switching through auto high beam control. The term "target detection" means detection of a leading vehicle or of an oncoming vehicle. In this case, an LED 28 illuminating the leading vehicle or the oncoming vehicle is turned off.

The term "vehicle-speed change" means a change in the vehicle speed, or more specifically, a change in the vehicle speed among a high speed (e.g., over 80 km/h), a medium speed (e.g., from 60 km/h to 80 km/h), and a low speed (e.g., lower than 60 km/h). In this case, a change is made to a high-speed mode that is suitable for high-speed driving, a medium-speed mode that is suitable for medium-speed driving, or a low-speed mode that is suitable for low-speed driving, and the light-distribution pattern is switched accordingly. The term "steering-angle change" means a change in the steering angle, or more specifically, means that the steering angle has reached or exceeded or has fallen below a predetermined value (e.g., 10°). In this case, the light-distribution pattern is switched to illuminate the traveling direction.

The priority 34*b* indicates which gradual-change time is to be given a higher priority when a light-distribution pattern that is in the middle of switching in association with a certain event is to be switched to a different light-distribution pattern in association with another event that has occurred after the aforementioned event. In this example, a smaller number indicates a higher priority. The gradual-change time 34*c* indicates a switching time in which a light-distribution pattern is to be switched in association with each of the events, or in other words, a gradual-change time in which the luminance of an LED 28 is to be changed in association with each of the events.

The lamp control unit 26 controls on/off of the plurality of LEDs 28 individually on the basis of the pattern instruction S1. In the present embodiment, the lamp control unit 26 determines in which one of the gradual-change times the luminance of each of the plurality of LEDs 28 is to be changed by referring to the storage unit 34 and generates an on/off instruction signal S3 instructing the LEDs 28 to be turned on or off in the determined gradual-change time.

When the lamp control unit 26 receives a pattern instruction S1 while the light-distribution pattern is not being switched (hereinafter, the pattern instruction S1 received at this point is also referred to as a "first pattern instruction S1*a*"), the lamp control unit 26 controls on/off of the plurality of LEDs 28 individually so as to switch to a light-distribution pattern indicated by the first pattern instruction S1*a* (hereinafter, also referred to as a "first light-distribution pattern"). Specifically, the lamp control unit 26, by referring to the storage unit 34, determines to gradually change the luminance to reach the luminance corresponding to the first light-distribution pattern (hereinafter, referred to as "first luminance") in a gradual-change time corresponding to an event that has caused the switching to the first light-distribution pattern (hereinafter, such an event is referred to as a "first event") (hereinafter, such a gradual-change time is referred to as a "first period"). In this case, the lamp control unit 26 generates, as the on/off instruction signal S3, an on/off instruction signal S3*a* instructing on/off in the gradual-change time corresponding to the event.

In addition, when the lamp control unit 26 receives a new pattern instruction S1 in the middle of switching to a given light-distribution pattern (e.g., first light-distribution pattern) (hereinafter, the pattern instruction S1 received at this point is also referred to as a "second pattern instruction S1*b*"), the lamp control unit 26 controls on/off of the plurality of LEDs 28 individually so as to switch to a light-distribution pattern indicated by the second pattern instruction S1*b* (hereinafter, also referred to as a "second light-distribution pattern"). Specifically, the lamp control unit 26 refers to the storage unit 34 and compares the priority of the first event with the priority of the event that has caused the switching to the second light-distribution pattern (hereinafter, referred to as a "second event").

When the priority of the second event is higher than the priority of the first event, the lamp control unit 26 determines to gradually change the luminance to reach the luminance corresponding to the second light-distribution pattern (hereinafter, referred to as "second luminance") in a gradual-change time corresponding to the second event (hereinafter, referred to as a "second period"). In this case, the lamp control unit 26 generates, as the on/off instruction signal S3, an on/off instruction signal S3*a* instructing the on/off in the gradual-change time corresponding to the event. Meanwhile, when the priority of the first event is higher than the priority of the second event, the lamp control unit 26 determines to gradually change the luminance to reach the second luminance irrespective of the second period. In the present embodiment, the lamp control unit 26 determines to gradually change the luminance to reach the second luminance in the time remaining in the first period. In this case, the lamp control unit 26 generates, as the on/off instruction signal S3, an on/off instruction signal S3*b* instructing the on/off in the time that is not dependent on the gradual-change time corresponding to the event.

The lighting circuit 24 includes driving circuits 30 and gradual-change controllers 32 that are provided for the respective LEDs 28. The driving circuits 30 supply, to the LEDs 28, driving currents $I_{LD}$ corresponding to respective light-control signals S4. Each driving circuit 30 may perform both analog light control of adjusting the amount of the driving current $I_{LD}$ and pulse-width modulation (PWM) light control of varying the duty cycle of the driving current $I_{LD}$ by switching the driving current $I_{LD}$ at high speed or may perform only one of the two.

Each gradual-change controller 32 generates a light-control signal S4 that gradually changes over time in accordance with an on/off instruction signal S3 from the lamp control unit 26. Specifically, when the luminance is to be lowered, the gradual-change controller 32 causes the light-control signal S4 to change gently over time in a direction in which the driving current $I_{LD}$ decreases. Meanwhile, when the luminance is to be raised, the gradual-change controller 32 causes the light-control signal S4 to change gently over time in a direction in which the driving current $I_{LD}$ increases.

Figure 3:
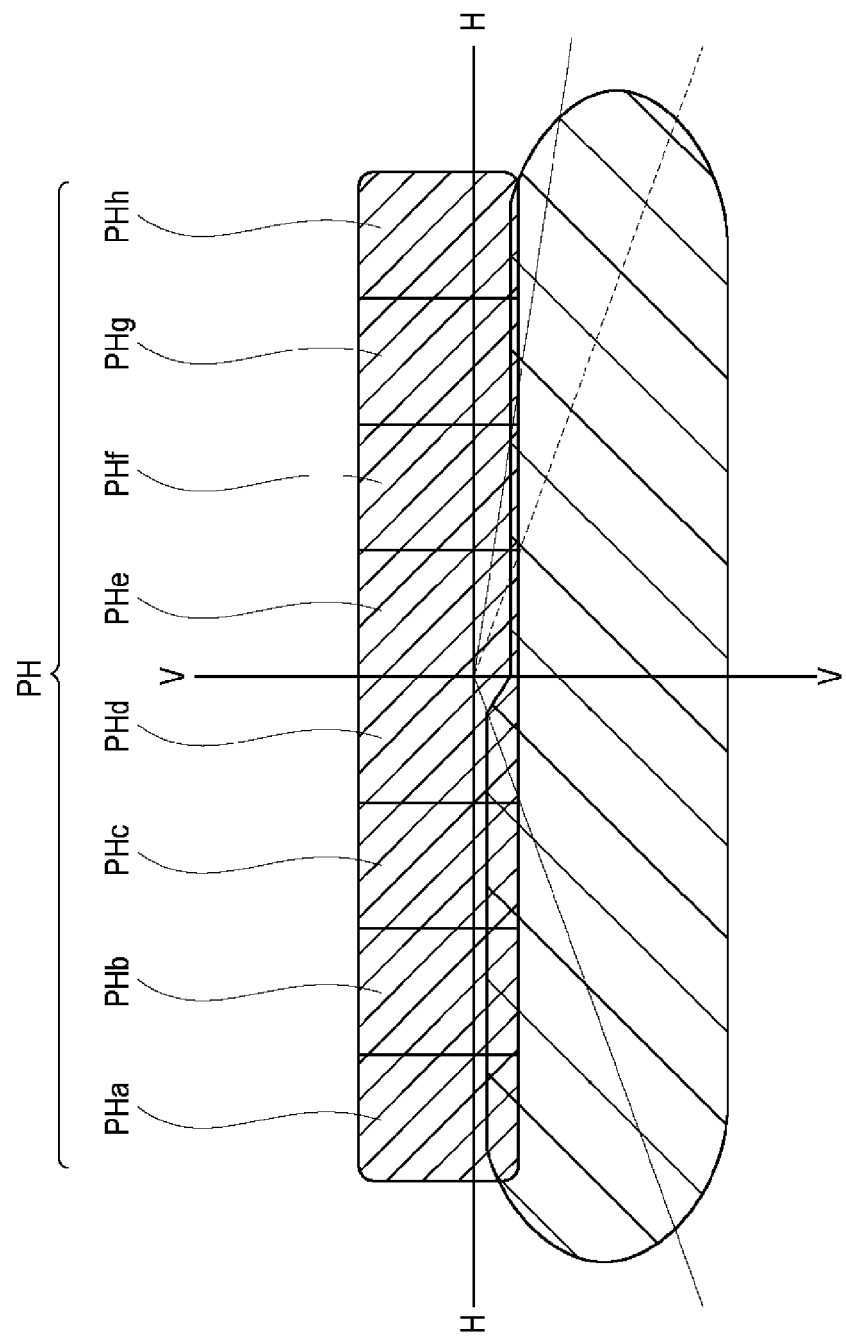
FIG. 3 schematically illustrates a light-distribution pattern formed by a vehicle lamp.

FIG. 3 schematically illustrates a light-distribution pattern formed by the vehicle lamp system 100 configured as described above. FIG. 3 illustrates a light-distribution pattern formed on a virtual vertical screen disposed at a predetermined position in front of the lamp, for example, at a position 25 meters ahead of the lamp.

A light-distribution pattern PH is a high-beam light-distribution pattern formed by illumination light of the lamp unit 20. The light-distribution pattern PH is divided into a plurality of (eight herein) partial regions PHa through PHh, and the partial regions correspond to the respective LEDs 28. In other words, the vehicle lamp 18 can form, in an area in front of the vehicle, the high-beam light-distribution pattern PH consisting of the plurality of partial regions PHa through PHh corresponding to the illumination regions of the respective LEDs 28.

Figure 4A:
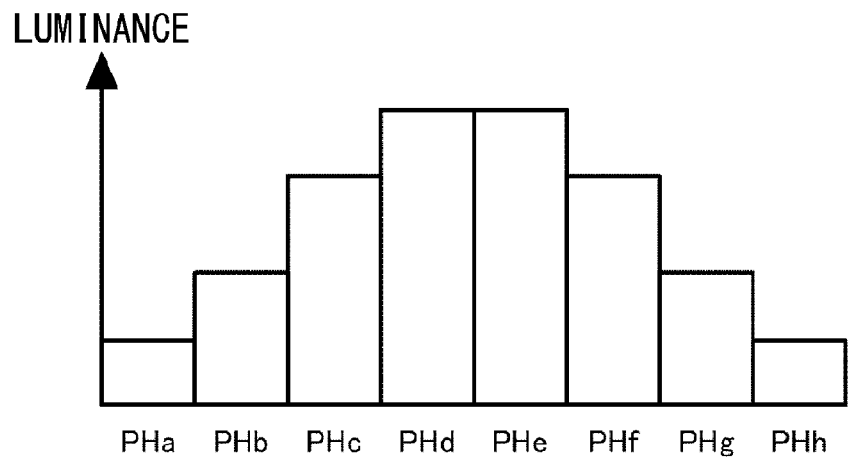
FIGS. 4A through 4E illustrate an example of a luminance distribution of each partial region of a high-beam light-distribution pattern.
Figure 4B:
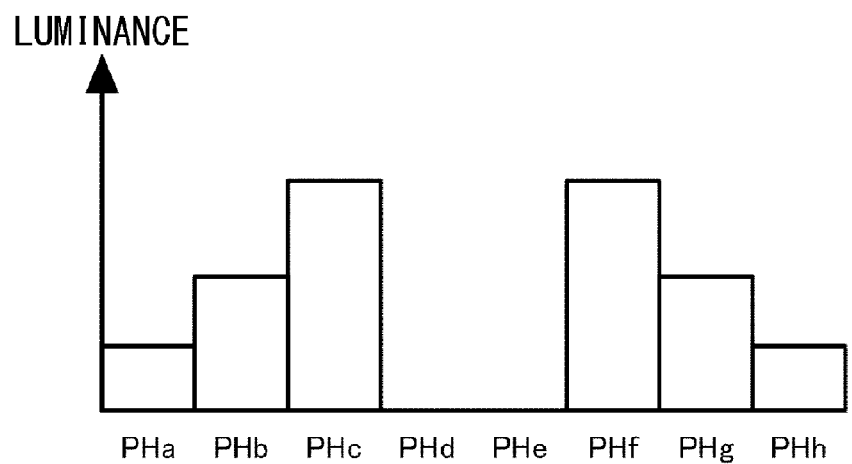
Figure 4C:
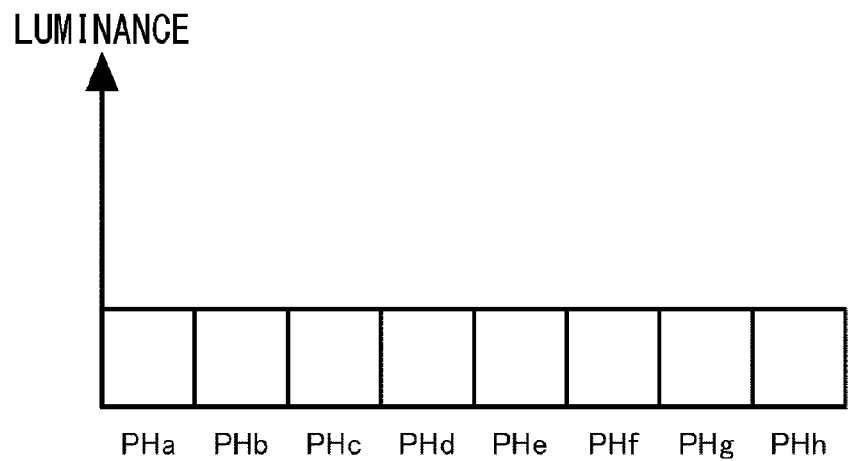
Figure 4D:
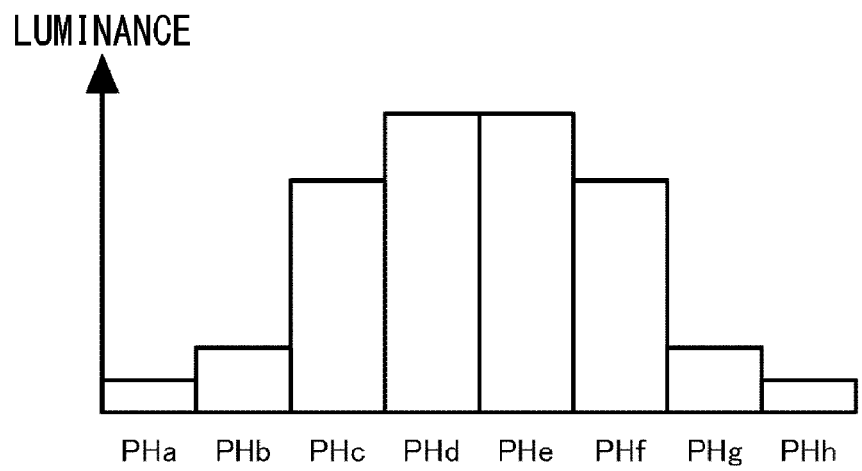
Figure 4E:
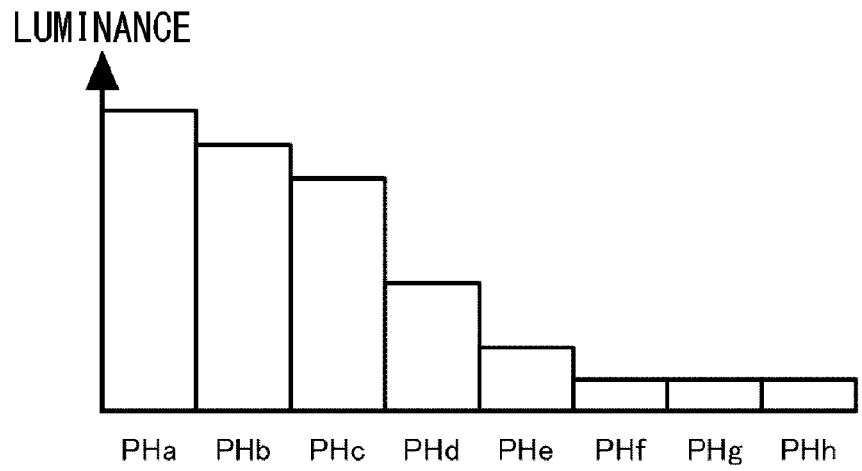

FIGS. 4A and 4B illustrate an example of a luminance distribution of each of the partial regions PHa through PHh of the light-distribution pattern PH. The longer a given bar is, the higher is the luminance of its corresponding partial region (i.e., the longer a given bar is, the higher the luminance of the LED 28 is that illuminates the corresponding partial region). FIG. 4A illustrates an example of the luminance distribution of the partial regions PHa through PHh of the light-distribution pattern PH formed when the high beam has been switched from on to off during medium-speed driving, or in other words, when an event of "beam switching" has occurred. FIG. 4B illustrates an example of the luminance distribution of the partial regions PHa through PHh of the light-distribution pattern PH formed when a leading vehicle or an oncoming vehicle has been detected, or in other words, when an event of "target detection" has occurred. This example illustrates a case in which a leading vehicle or an oncoming vehicle has been detected in the partial regions PHd and PHe. FIGS. 4C and 4D illustrate examples of the luminance distribution of the partial regions PHa through PHh of the light-distribution pattern PH formed when the vehicle speed has changed from the medium-speed driving to the low-speed driving and when the vehicle speed has changed from the medium-speed driving to the high-speed driving, respectively, or in other words, when an event of "vehicle-speed change" has occurred. FIG. 4E illustrates an example of the luminance distribution of the partial regions PHa through PHh of the light-distribution pattern PH formed when the steering wheel has been turned left, or in other words, when an event of "steering-angle change" has occurred. As illustrated in FIGS. 4A through 4E, when an event occurs, the light-distribution pattern is switched in accordance with that event, and the luminance of a partial region (i.e., the luminance of an LED 28 illuminating the partial region) changes.

Figure 5:
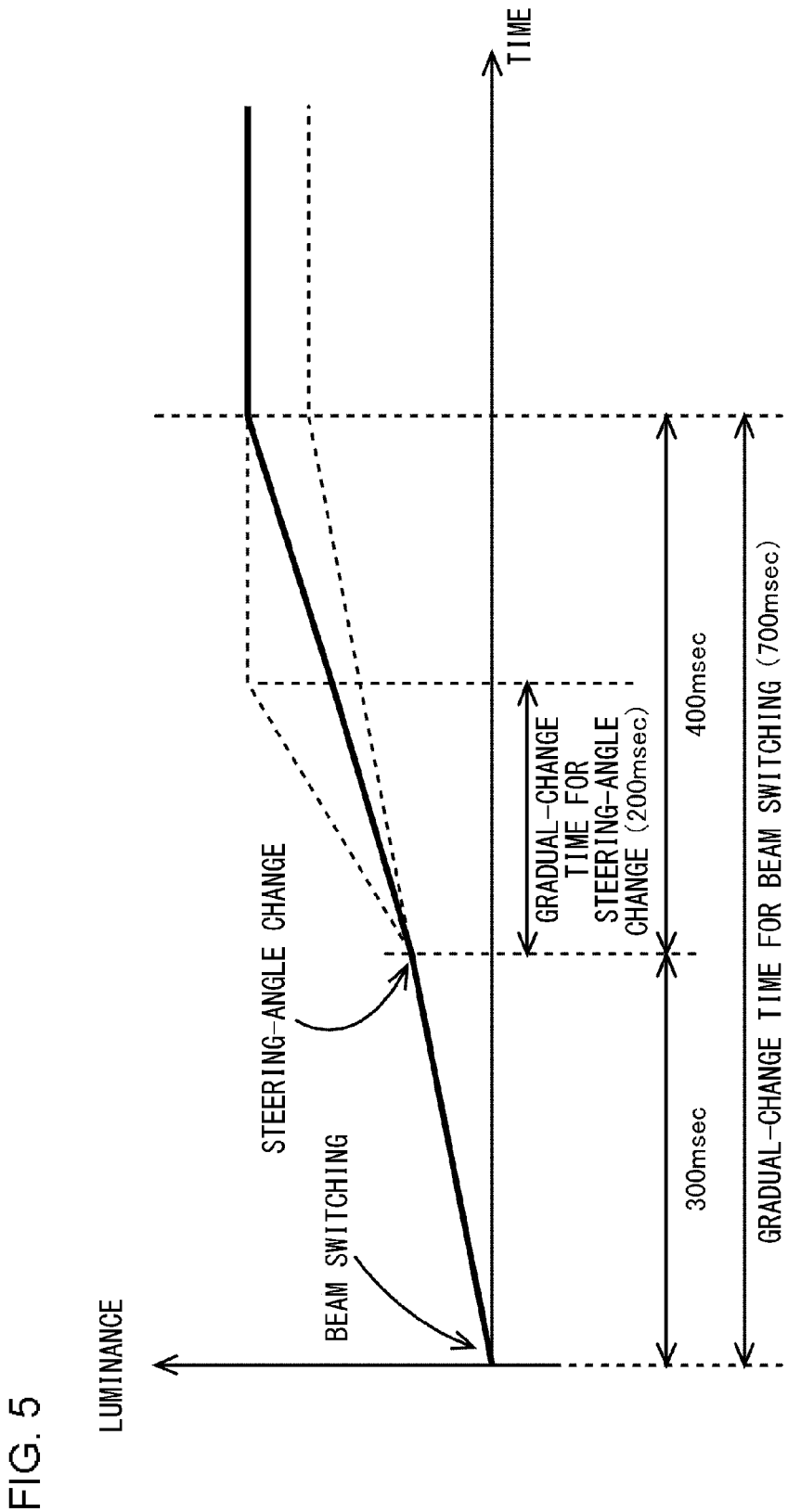
FIG. 5 illustrates an example of a change in the luminance of an LED and illustrates another example of the distribution.

FIG. 5 illustrates an example of a change in the luminance of an LED 28 illuminating a given partial region. In FIG. 5, the horizontal axis represents the time, and the vertical axis represents the luminance. FIG. 5 illustrates a case in which the light-distribution pattern is switched upon the steering-angle change serving as the second event having occurred in the middle of switching the light-distribution pattern in association with the beam switching serving as the first event (while the luminance of the LED 28 is being switched).

Upon receiving a first pattern instruction S1a indicating a switch to the first light-distribution pattern in association with an occurrence of beam switching, the lamp control unit 26 generates an on/off instruction signal S3a that gradually changes the luminance to reach the target luminance in a gradual-change time (700 msec) corresponding to the beam switching. On the basis of this on/off instruction signal S3a, the gradual-change controller 32 generates a light-control signal S4 that changes, in 700 msec, in a direction in which the driving current $I_{LD}$ increases. The driving circuit 30 supplies, to the LED 28, the driving current $I_{LD}$ corresponding to this light-control signal S4 and gradually raises the luminance of the LED 28.

Upon receiving a second pattern instruction S1b indicating a switch to the second light-distribution pattern in association with an occurrence of steering-angle change, the lamp control unit 26 refers to the storage unit 34 and checks the priorities of the beam switching and the steering-angle change. In the present embodiment, the lamp control unit 26 determines that the priority of the beam switching, which is the event that has occurred earlier, is higher than the priority of the steering-angle change, which is the event that has occurred later (see FIG. 2).

Therefore, the lamp control unit 26 generates an on/off instruction signal S3b that gradually changes the luminance to reach the target luminance of the second light-distribution pattern in the time remaining in the gradual-change time (700 msec) corresponding to the beam switching irrespective of the gradual-change time (200 msec) corresponding to the steering-angle change. For example, if the steering-angle change occurs when 300 msec has passed since the occurrence of the beam switching, the lamp control unit 26 generates an on/off instruction signal S3b that gradually changes the luminance to reach the target luminance of the second light-distribution pattern in the remaining 400 (=700−300) msec.

On the basis of the on/off instruction signal S3b, the gradual-change controller 32 generates a light-control signal S4 that changes, in 400 msec, in a direction in which the driving current $I_{LD}$ increases. The driving circuit 30 supplies, to the LED 28, the driving current $I_{LD}$ corresponding to this new light-control signal S4 and gradually raises the luminance of the LED 28.

With the vehicle lamp system 100 according to the embodiment described above, when the priority of the second event is lower than the priority of the first event, the luminance of the LED 28 is gradually changed to reach the target luminance irrespective of the second period. In other words, when the priority of the event that has occurred later is lower than the priority of the event that has occurred earlier, the luminance of the LED 28 is gradually changed irrespective of the time corresponding to the event that has occurred later. Accordingly, by setting the priorities appropriately, a change in the luminance associated with an event with a higher priority can be achieved in an intended period of time irrespective of the event that occurs later.

Thus far, the present invention has been described on the basis of an embodiment. This embodiment, however, is merely illustrative, and it should be appreciated by a person skilled in the art that various modifications can be made to the combinations of the components and the processing processes of the embodiment and that such modifications also fall within the scope of the present invention. Hereinafter, such modifications will be described.

(First Modification)

In the embodiment, a case in which the luminance is gradually changed to reach the second luminance in the time remaining in the first period if the priority of the first event is higher than the priority of the second event has been described, but this is not a limiting example. When a predetermined condition is satisfied, even if the priority of the second event is lower than the priority of the first event, the luminance may be gradually changed to reach the second luminance in the second period if the time remaining in the first period is shorter than the second period. In this case, a rapid change in the luminance of an LED can be suppressed. Examples of the predetermined condition include a case in which the first event is an event in which the plurality of LEDs 28 that are all off are turned on (i.e., beam switching) and the second event is the steering-angle change. When the LEDs 28 that are all off are to be turned on, if the luminance of all of the LEDs 28 changes rapidly, the driver may have a sense of discomfort, but this can be suppressed by the modification.

The present invention has been described on the basis of embodiments with the use of specific terms, but the embodiments merely illustrate the principle and the applications of the present invention, and a number of modifications of the embodiments and changes in the arrangement can be made within a scope that does not depart from the spirit of the present invention set forth in the claims.

A vehicle lamp system according to an aspect of the present invention includes a lamp unit that combines light beams from a plurality of light-emitting elements to illuminate with a predetermined beam, a control unit that controls a change in luminance of the plurality of light-emitting elements in accordance with at least one of an instruction from a vehicle and information indicating a driving condition, and a storage unit that stores information indicating a priority of an event that causes the luminance of the plurality of light-emitting elements to be changed. In a case in which a second event occurs while the luminance of the plurality of light-emitting elements is being gradually changed to reach first luminance in a first period corresponding to a first event, the control unit (i) gradually changes the luminance of the plurality of light-emitting elements to reach second luminance in a second period corresponding to the second event if the priority of the second event is higher than the priority of the first event, and (ii) gradually changes the luminance of the plurality of light-emitting elements to reach the second luminance irrespective of the second period if the priority of the second event is lower than the priority of the first event.

According to this aspect, when the priority of an event that occurs later is lower than the priority of an event that occurs earlier, the luminance of the light-emitting element is gradually changed irrespective of the time corresponding to the event that occurs later. Accordingly, by setting the priorities appropriately, a change in the luminance associated with an event with a higher priority can be achieved in an intended period of time irrespective of an event that occurs later.

The control unit may gradually change the luminance of the plurality of light-emitting elements to reach the second luminance in a time remaining in the first period if the priority of the second event is lower than the priority of the first event.

When a predetermined condition is satisfied, even if the priority of the second event is lower than the priority of the first event, the control unit may gradually change the luminance of the plurality of light-emitting elements to reach the second luminance in the second period if a time remaining in the first period is shorter than the second period. This configuration makes it possible to suppress a rapid change in the luminance of the light-emitting elements.

The predetermined condition may be that the first event is an event in which the plurality of light-emitting elements that are all off are turned on.

What is claimed is:

1. A vehicle lamp system, comprising:
   a lamp unit that combines light beams from a plurality of light-emitting elements to illuminate with a predetermined beam;
   a control unit that controls a change in luminance of the plurality of light-emitting elements in accordance with at least one of an instruction from a vehicle and information indicating a driving condition; and
   a storage unit that stores information indicating a priority of an event that causes the luminance of the plurality of light-emitting elements to be changed,
   wherein, in a case in which a second event occurs while the luminance of the plurality of light-emitting elements is being gradually changed to reach first luminance in a first period corresponding to a first event, the control unit: (i) gradually changes the luminance of the plurality of light-emitting elements to reach second luminance in a second period corresponding to the second event if priority of the second event is higher than priority of the first event; and (ii) gradually changes the luminance of the plurality of light-emitting elements to reach the second luminance irrespective of the second period if the priority of the second event is lower than the priority of the first event.

2. The vehicle lamp system according to claim 1, wherein the control unit gradually changes the luminance of the plurality of light-emitting elements to reach the second luminance in a time remaining in the first period if the priority of the second event is lower than the priority of the first event.

3. The vehicle lamp system according to claim 1, wherein, when a predetermined condition is satisfied, even if the priority of the second event is lower than the priority of the first event, the control unit gradually changes the luminance of the plurality of light-emitting elements to reach the second luminance in the second period if a time remaining in the first period is shorter than the second period.

4. The vehicle lamp system according to claim 3, wherein the predetermined condition is that the first event is an event in which the plurality of light-emitting elements that are all off are turned on.

* * * * *